3,388,036
METAL-COATED PLASTIC LAMINATE
Daniel A. Alampi, Coshocton, Ohio, assignor to General
  Electric Company, a corporation of New York
No Drawing. Filed July 12, 1965, Ser. No. 471,411
                8 Claims. (Cl. 161—185)

This invention relates to plastic laminates. More particularly, it relates to metal-clad plastic laminates which are characterized by improved adhesion of the metal to the surface of the laminate. Specifically, the invention relates to laminates of the type described in which the surface of the laminate is prepared from glass fiber paper impregnated with a particular resinous composition which provides superior adhesion of any overlying deposited metal layer.

Copper-clad or metal-clad plastic laminates are well known, such materials having found widespread use in the preparation of printed electric circuit boards and in other applications. It is a requirement of such circuit boards that the copper or other metal deposited or coated on its surface be particularly adherent so that vigorous physical handling or chemical treatment during the preparation of the circuit patterns on the board, as well as rough handling during installation with other electrical components and subsequent use, will not cause failure of the metal-to-laminate bond.

It is a primary object of this invention to provide plastic laminates having a surface structure which is particularly adherent to chemically or electrically deposited metal layers, such as copper, aluminum, nickel, silver, and the like.

Briefly, the invention relates to plastic laminates having a core which may be of any desired stock impregnated with a resin and having superposed thereon a surface layer comprising glass fiber paper impregnated with a resinous composition comprising 70 parts of a phenolic resin modified epoxy resin to which there may be added up to about 50 parts by weight of a phenoxy resin which is a thermoplastic condensation polymer reaction product of a polyhydric alcohol or polyhydric phenol and an epihalohydrin, e.g., bisphenol-A and epichlorohydrin, the resinous composition being cured by means of a tertiary amine catalyst. It relates also to such laminates which have deposited thereon a metal layer.

Those features of the invention which are believed to be novel are set forth with particularity in the claims appended hereto. The invention will, however, be better understood and further advantages and objects thereof appreciated from a consideration of the following description.

The core of the present laminates can consist of any of the usual materials used for laminate cores, including kraft or other types of paper or cellulosic materials, synthetic materials and inorganic materials, either alone or in combination. The core laminae, for example, can consist of glass fabric or other natural or synthetic fabrics such as rayon, polyethylene terephthalate fabrics, acrylic fabric, asbestos fabric, and the like, or fibers of such materials, alone or in combination. A core material which has been found to be particularly useful is one consisting of cellulose paper reinforced with glass fibers. Any of a number of thermosetting resins well known to those skilled in the art can be used in impregnating the core stock and are usually those which are conventionally used in the production of laminates. The most common of these resins is a condensation product of a phenol and an aldehyde, generally an alkaline catalyzed phenol-formaldehyde condensation product. It will be realized that the core stock of the invention can be varied in accordance with the particular properties desired, and the manner of preparation of the laminate core both as to the composition of the core itself and the impregnating resin is not considered a critical part of this invention except as it furnishes a suitable base for the laminate surface.

It has been found that the surface layer which provides the best adhesion to deposited metals when used in conneciton with the resins set forth herein consists of glass paper or mat which is prepared by laying down glass fibers in paper-making fashion or otherwise in a random-oriented manner. Preferably, these fibers have an average length of about ⅜ inch although it will be realized that the length of such fibers can vary widely. Generally speaking, glass paper made from fiber having a length range of from about ⅛ inch to ⅝ inch has been found to be suitable for the present purpose. It has been found that glass fibers which have been sized with such materials as silicones typified by unsaturated trichlorosilanes or various chromium-containing materials such as methylethylene chromic chloride provide materials having better electrical properties.

It has also been found that a phenolic modified epoxy resin material cured with a tertiary amine, such resin being used alone or with up to about 50 parts by weight of a phenoxy resin, provides superior adhesion for any deposited metal layer which is placed thereon.

The phenolic modified epoxy resin of the present invention is typified by Union Carbide Bakelite ELS 3001 resin which has a viscosity at 25° C. of 50–140 centipoises, a specific gravity at 25° C. of from 1.080 to 1.098 and an epoxy assay of 350–500 grams per gram mole. Typically, such materials are provided as a 70% solution of the resin in toluene.

The phenoxy resin manufactured by Union Carbide at Bakelite PAHJ resin which has been found useful in the present instance is a high molecular weight thermoplastic copolymer of bisphenol-A and epichlorohydrin having the following typical structural formula:

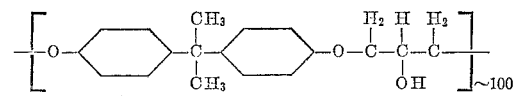

It will be noted that while the above phenoxy resin is derived from the same materials as epoxy resins, it contains no epoxy groups.

The tertiary amines which are useful in connection with the present invention are those selected from tertiary amines having the general formula $R_3N$ where R is a monovalent hydrocarbon radical, for instance, alkyl radicals, e.g., methyl, ethyl, propyl, butyl, octyl, etc. radicals; aryl radicals, e.g., phenyl, naphthyl, xylyl, tolyl, etc. radicals; aralkyl radicals, e.g., benzyl, phenylethyl, etc. radicals; alkenyl radicals, e.g., vinyl, allyl, etc. radicals; cyanoalkyl radicals, e.g., cyclohexyl, cycloheptyl, etc. radicals; cycloalkenyl radicals, e.g., cyclopentenyl, cyclohexenyl, etc. radicals. Among the tertiary amines which may be employed are, for instance, triethyl amine, tributyl amine, triamyl amine, methyldibutyl amine, triphenyl amine, tribenzyl amine, methyldiphenyl amine, dimethylcoco amine, triamyl amine, dimethyloctadecyl amine, triamyl amine, dimethyldodecyl amine, benzyldimethyl amine, etc. For the purpose of this invention, the term "tertiary amine" as herein used is intended to mean amines of the above formula. It will be obvious that derivatives of the above amines, for example, salts of such amines, such as tributyl amine hydrochloride, triamyl amine acetate, etc.; quaternary ammonium bases of the amines, such as benzyl trimethyl ammonium hydroxide, benzyl trimethyl ammonium methoxide, etc., which decompose to amines in place of the amines themselves, are not precluded.

Generally speaking, from about 0.1 part to 3 parts of tertiary amine catalyst are used, based on the weight of the phenolic modified epoxy resin. Preferably, from about 0.3 part to 1 part are used.

Any of the usual solvents can be used in preparing the impregnating resin solutions of the present invention including methyl ethyl ketone, acetone, toluene, methyl cellosolve and the like, many of which will occur to those skilled in the art.

The following examples will illustrate the practice of the invention, it being realized that they are to be taken as exemplary only and not as limiting in any way.

EXAMPLE 1

There was prepared a core stock from 6 plies of fiber reinforced alpha cellulose 15 mils thick impregnated with a 50% solution of alkaline catalyzed phenol formaldehyde laminating resin, the impregnated core stock being oven dried at a temperature of from 105° C. to 180° C. to provide a final resin solids content of 60% maximum of the total weight of the core.

The surface layer used was one 10 mil thick ply of glass paper laid down with glass fibers having an average length of 3/16 inch.

The surface layer impregnating resin composition was prepared from 100 parts (70% by weight solid resin in toluol) of phenolic resin modified epoxy resin, Bakelite ELS 3001, together with 30 parts of Bakelite PAHJ phenoxy resin as described above, along with solvent consisting of 27 parts methyl ethyl ketone, 33 parts methyl cellosolve and 11 parts of toluene. The tertiary amine catalyst was 0.7 part of dimethyl benzyl amine.

While the surface stock can be treated with its impregnating resin in any particular manner as by dipping, brush, roll coating and the like, in the particular instance it was roll coated on the surface stock which was then dried for 5 minutes at 160° C. to provide a resin solids content of 75% by weight of the impregnated stock.

With the core stock and the surface stock prepared, the surface stock was placed over the core stock, placed in a press and cured in conjunction with the core stock at a temperature of 160° C. and a pressure of 1200 p.s.i. for about 30 minutes to provide a final laminate in which the core was about 60 mils thick and the surface laminae about 3 to 4 mils thick.

There was plated on the surface of the finished laminate a layer of copper equal in weight to 0.8 to 3.0 ounces per square foot. When tested for adhesion by peeling the copper at a right angle to the laminate from 1 to 10 inches per minute, it was found that the adhesion of the copper layer to the surface laminate ranged from about 3.7 to 5.0 lbs./inch width.

It was found that heat conditioning the laminate at elevated temperatures ranging from about 128° C. to 150° C. for times varying up to 56 days and especially at least one day to 56 days resulted in improved peel strength. For example, when the laminate of this example was heat treated or conditioned for eight days at 150° C., the peel strength of the copper layer increased to about 6 to 8 lbs./inch width.

EXAMPLE 2

Example 1 was repeated except that there was used in lieu of the glass fiber paper surface stock a material consisting solely of alpha cellulose paper of the same finished thickness. When this surface was coated with copper plate equal in weight from 0.8 to 3.0 ounces per square foot and tested for peel strength, it was found that such strength ranged from about 2.7 to 3.4 lbs./inch, substantially less than that using the glass fiber made of this invention. Even when the copper-clad laminate having the cellulosic base surface stock was heat treated or conditioned for 8 days at 150° C., the peel strength had increased only to from about 4 to 6 lbs./inch width.

EXAMPLE 3

Example 1 was repeated in all respects except that there was used as the surface stock material an asbestos paper material having the same finished thickness as the glass fiber mat or paper of the present invention. When a laminate so constructed and coated with plated copper equal in weight from 0.8 to 3.0 ounces per square foot was tested for peel strength, it was found to range only from 2.8 to 3.3 lbs./inch width or substantially less than that obtained with the present glass fiber paper surface layer.

EXAMPLE 4

Example 1 was repeated except that the phenolic modified epoxy resin was used without the addition of the phenoxy resin or thermoplastic polymer of bisphenol-A and epichlorohydrin for the surface laminae. It was found that the adhesion of the plated copper layer ranged from 3.0 to 4.0 lbs./inch width.

Not only is the adhesion of the metal layer to the laminate enhanced by the peculiar surface structure of the present laminates, but the other physical and electrical characteristics of the laminate taken as a whole are salutary in character. For instance, the laminate of Example 1 has an Izod impact strength of 2.7 foot pounds/inch notch lengthwise and 1.8 foot pounds/inch crosswise. The flexural strength of the material is 26,000 p.s.i. lengthwise and 20,000 p.s.i. crosswise; the modulus of elasticity is 1,400,000 p.s.i. lengthwise and 1,100,000 p.s.i. crosswise; and the power factor at $10^6$ cycles is 0.030 and the dielectric constant at the same frequency is 4.0. The surface resistance of the laminate without the copper plate is 10,000 megohms and the volume resistivity is greater than 3,000,000 megohms tested after 96 hours at 90% relative humidity at 35° C. The heat resistance of the material is greater than 15 seconds at 550° F. by solder flotation.

There are prepared, then, by the present invention metal coated laminates which are characterized by superior adhesion of the deposited metal coating to the underlying laminate. In addition, the various other electrical and physical properties of the laminates are such that they are peculiarly suitable for making rugged circuit boards for electrical equipment.

What I claim as new and desire to secure by Letters Patent of the United States is:

1. A plastic laminate comprising a resin-impregnated core stock and a surface layer comprising glass fiber paper impregnated with a resinous composition comprising, by weight, 70 parts of phenolic-modified epoxy resin, up to 50 parts of thermoplastic condensation polymer of an epihalohydrin and a material selected from the group consisting of polyhydric alcohols and polyhydric phenols and from about 0.1 part to 3 parts tertiary amine.

2. A plastic laminate comprising a resin-impregnated core stock and a surface layer comprising glass fiber paper impregnated with a resinous composition comprising, by weight, 70 parts of phenolic modified epoxy resin, up to 50 parts of thermoplastic condensation polymer of bisphenol-A and epichlorohydrin, and from about 0.1 part to 3 parts tertiary amine.

3. A plastic laminate comprising a resin-impregnated core stock and a surface layer comprising glass fiber paper impregnated with a resinous composition comprising, by weight, 70 parts of phenolic-modified epoxy resin, 30 parts of thermoplastic condensation polymer of an epihalohydrin and a material selected from the group consisting of polyhydric alcohols and polyhydric phenols and from about 0.1 part to 3 parts tertiary amine.

4. A metal coated plastic laminate characterized by superior bond strength of the metal coating to the laminate, said laminate comprising a resin-impregnated core stock and a surface layer comprising glass fiber paper impregnated with a resinous solution comprising, by weight, 70 parts of phenolic-modified epoxy resin, up to 50 parts of thermoplastic condensation reaction product of an epihalohydrin and a material selected from the group consisting of polyhydric alcohols and polyhydric phenols and from about 0.1 part to 3 parts tertiary amine, said metal being deposited on said surface layer.

5. A metal coated plastic laminate characterized by superior bond strength between the metal coating and the laminate surface, said surface layer comprising glass fiber paper impregnated with a resinous solution comprising, by weight, 70 parts of phenolic-modified epoxy resin, up to 50 parts of thermoplastic condensation reaction product of an epihalohydrin and a material selected from the group consisting of polyhydric alcohols and polyhydric phenols and from about 0.1 part to 3 parts tertiary amine, said metal being deposited on said surface layer.

6. A metal coated plastic laminate characterized by superior bond strength between the metal coating and the laminate surface, said surface layer comprising glass fiber paper impregnated with a resinous solution comprising, by weight, 70 parts of phenolic modified epoxy resin, 30 parts of thermoplastic condensation reaction product of bisphenol-A and epichlorohydrin and 0.7 part tertiary amine.

7. A copper coated plastic laminate characterized by superior bond strength between the copper coating and the laminate surface, said surface layer comprising glass fiber paper impregnated with a resinous solution comprising, by weight, 70 parts of phenolic-modified epoxy resin, up to 50 parts of thermoplastic condensation reaction product of an epihalohydrin and a material selected from the group consisting of polyhydric alcohols and polyhydric phenols and from about 0.1 part to 3 parts tertiary amine, said copper being deposited on said surface layer.

8. A copper coated plastic laminate characterized by superior bond strength between the copper coating and the laminate surface, said surface layer comprising glass fiber paper impregnated with a resinous solution comprising, by weight, 70 parts of phenolic modified epoxy resin, 30 parts of thermoplastic condensation reaction product of bisphenol-A and epichlorohydrin and 0.7 part tertiary amine.

References Cited
UNITED STATES PATENTS

| | | | |
|---|---|---|---|
| 2,694,028 | 11/1954 | Rapp | 161—165 |
| 2,920,990 | 1/1960 | Been et al. | 161—184 |
| 2,932,599 | 4/1960 | Dahlgren | 156—3 |
| 3,011,909 | 12/1961 | Hart et al. | 161—186 X |
| 3,032,460 | 5/1962 | Chipman et al. | 161—186 X |
| 3,177,089 | 4/1965 | Marshall et al. | 117—72 |
| 3,177,090 | 4/1965 | Bayes et al. | 117—72 |
| 3,238,087 | 3/1966 | Norwalk et al. | 161—186 X |
| 3,308,204 | 3/1967 | Bugel | 161—186 X |
| 3,340,606 | 12/1967 | Anderson et al. | 29—625 |

HAROLD ANSHER, *Primary Examiner.*